(No Model.)

A. A. DOWNEY.
GAME TRAP.

No. 601,243. Patented Mar. 29, 1898.

ATTEST
Nora Graham
Ina Graham

INVENTOR
A. A. DOWNEY,
by L. P. Graham
his attorney

UNITED STATES PATENT OFFICE.

ANDREW A. DOWNEY, OF ARMSTRONG, ILLINOIS.

GAME-TRAP.

SPECIFICATION forming part of Letters Patent No. 601,243, dated March 29, 1898.

Application filed September 1, 1897. Serial No. 650,245. (No model.)

*To all whom it may concern:*

Be it known that I, ANDREW A. DOWNEY, of Armstrong, in the county of Vermilion and State of Illinois, have invented certain new and useful Improvements in Game-Traps, of which the following is a specification.

This invention relates to a trap adapted to catch a number of animals alive one after another. It is intended to provide improved means whereby each animal caught will set the trap for the next succeeding one. It is exemplified in the structure hereinafter described, and it is defined in the appended claims.

Figure 1:
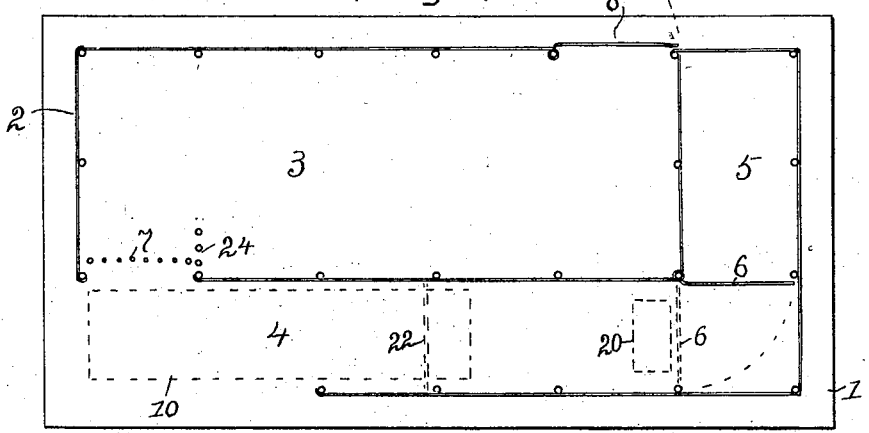
Figure 2:
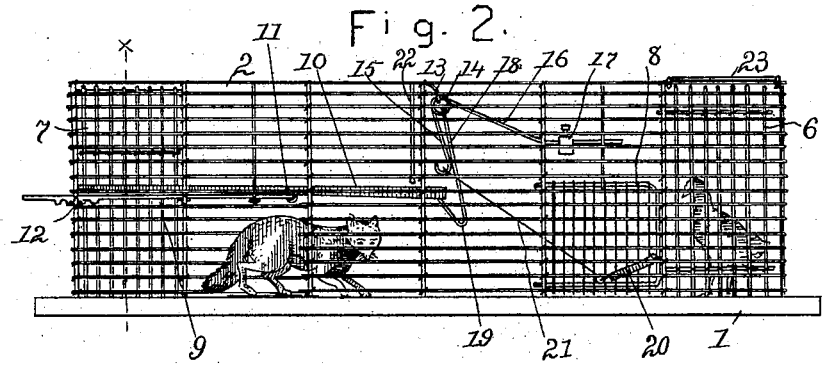
Figure 3:
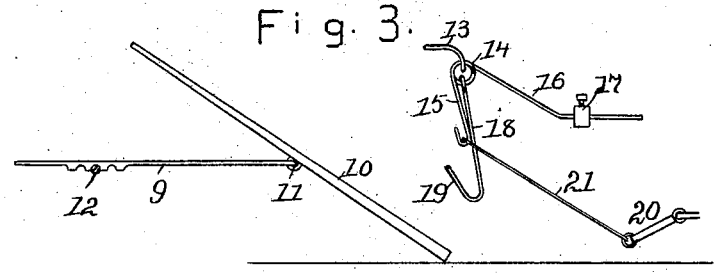
Figure 4:
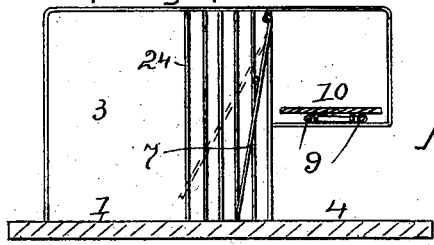

In the drawings forming part of this specification, Figure 1 is a base plan of the trap. Fig. 2 is a side elevation. Fig. 3 is a diagram illustrating the trigger mechanism and means for setting the same. Fig. 4 is a section through the trap on line x in Fig. 2.

The trap consists of a cage-compartment, a teeter-board, a trip-platform, trigger mechanism connected with the platform and adapted to hold the teeter-board in a horizontal position, an automatically-closing door leading from above the teeter-board to the cage-compartment, and a live-bait compartment, the parts being so disposed that the teeter-board is held approximately horizontal by the trigger mechanism. A passage-way extends under the teeter-board to the trip-platform, and an animal passes to the cage-compartment by traveling under the teeter-board to the trip-platform, disturbance of which permits the teeter-board to fall behind him, and thence up the inclined teeter-board and through the automatically-closing door of the cage. The travel of the animal over the teeter-board to the door leading into the cage-compartment causes the board to assume a horizontal position in engagement with the trigger mechanism, thus preparing for the admission of another animal to the trip-platform, and when the board is raised a partition is interposed between the animal on the board and the trip-platform.

The general location of the different features of the device is indicated in Fig. 1, where the base-board of the trap is shown at 1, the side walls at 2, the cage-compartment at 3, the inlet-passage at 4, the live-bait compartment at 5, a vertically-swinging gate for the live-bait compartment at 6, the teeter-board in the inlet-passage at 10, the trip-platform at 20, the partition over the teeter-board at 22, and the automatically-closing door leading to the cage-compartment is shown at 7. In addition to these the door by which the animals are taken from the cage is shown at 8, and a side wall for the door 7 is shown at 24.

The teeter-board 10 is pivoted between its ends in passage 4 at a height sufficient to permit animals to travel under it. Its inner end is slightly heavier than its outer end, and it is inclosed above and on its sides. The means employed to sustain the teeter-board consists of a frame 9, which is slidable horizontally in the frame of the cage and on the inner end 11 of which the teeter-board is pivoted. The outer end of frame 9 extends beyond the wall of the trap, and it is preferably provided with a set of notches in its under side, which notches are adapted to engage a cross-bar 12 of the trap-frame and hold the teeter-board in different positions lengthwise of the admission-passage. Above the inner end of the teeter-board a loop 13 is fastened to the trap-frame. A piece of wire is coiled through the loop, as shown at 14, extends downward at one end toward the teeter-board, as shown at 15, where it terminates in a hook, and its other end extends inward above the trip-platform, as shown at 16. An adjustable weight, as 17, is preferably mounted on the horizontal extension. A rod 18 is swung from ring 14 immediately behind rod 15, and it has an upturned hook 19 on its lower end, which is adapted to engage the inner end of the teeter-board. The trip-platform is hinged at its rear side, and a rod 21 extends from the forward side of the platform around rod 18 and engages with the hooked end of rod 15.

The teeter-board may be set toward or from the detent 19 in order to make the release of the board harder or easier, and so the trap may be set for animals of almost any size. The rod 16 counterbalances the swinging side of the trip-platform and holds it raised, and the weight 17 aids in effecting this result with precision. The detent-rod 18 rests normally against rod 15 and is carried backward therewith; but it is free to swing backward independent of the rod 15 and the trip-platform.

Inanimate bait may be attached to the platform 20, or live bait may be placed in compartment 5, depending on the nature of the game it is intended to trap, and in either case the animal attracted by the bait will sooner or later enter the unobstructed passage-way under the teeter-board and depress the trip-platform enough to disengage the detent-hook from the board. When this is accomplished, the inner end of the board will descend and close the passage. The animal will travel up the board in an effort to escape, thereby depressing the upper outer end of the board, and will eventually force its way through swinging door 7 into the cage-compartment. The door 7 closes by gravity and cannot be opened from the inside, and so the animal that once reaches compartment 3 is securely caged.

As the inner end of the teeter-board is raised by the weight of the animal on the outer end the detent-rod is forced rearward by the board, and it swings entirely independent of the rod that counterbalances the trip-platform. This makes it very easy to set the teeter-board after an animal is caught, and so the trap may be used to catch small animals as well as large ones. In case, however, that it should not be desired to have small animals in the trap the frame 9 may be set inward to such an extent that the hook of the detent will catch under the board too far for the weight of a small animal to detach it.

The door 6 is adjustable toward and from the trip-platform, and this provides further for adapting the trap for large or small game. When inanimate bait is used on the platform for small game, the door 6 is swung around to the vicinity of the platform, and when live bait is used for larger game the door is left in the position shown in the drawings.

A door 23 is made in the top of the trap-casing above the location of the bait, and through this door bait may be supplied and the working mechanism may be adjusted.

What I claim as new, and desire to secure by Letters Patent, is—

1. An animal-trap having an admission-passage and a cage-compartment, a teeter-board swung over the admission-passage and adapted to close the same, a swinging platform in the passage-way beyond the inner end of the teeter-board, an L-lever connected with the platform and adapted to counterbalance the weight thereof, and a detent for the board movable with the L-lever and also movable independent thereof substantially as set forth.

2. An animal-trap having an admission-passage and a cage-compartment, a detent swung in the passage-way, a teeter-board swung over the admission-passage in bearings adjustable toward and from the detent, and a platform swung in the passage-way beyond the inner end of the teeter-board and connected with the detent.

3. An animal-trap having an admission-passage and a cage-compartment, a teeter-board swung over the admission-passage and adapted to close the same, a swinging platform in the passage beyond the inner end of the teeter-board, a detent for the board adapted to be actuated by the platform, a door leading from the upper, outer end of the board to the cage-compartment, a live-bait compartment located near the platform and a door for the live-bait compartment swingable toward and from the platform.

4. In an animal-trap, the combination of teeter-board 10, platform 20, rods 15 and 16 bent to form ring 14 and supported through such ring, rod 21 connecting the hooked rod 15 with the platform, and the detent 18 swung from ring 14 in the rear of rod 15, the rod 16 being weighted to counterbalance the platform substantially as set forth.

In testimony whereof I sign my name in the presence of two subscribing witnesses.

ANDREW A. DOWNEY.

Attest:
H. RADERMACHER,
GEO. E. CRAYS.